United States Patent [19]

Grube et al.

[11] Patent Number: 5,361,402
[45] Date of Patent: Nov. 1, 1994

[54] TEST DEVICE FOR ANALYZING COMMUNICATION CHANNELS IN A TRUNKED RADIO SYSTEM

[75] Inventors: Gary W. Grube, Palatine, Ill.; Carl B. Olson, San Carlos, Calif.; Paul J. Cizek, Palatine, Ill.

[73] Assignee: Motorola, Inc., Schaumburg, Ill.

[21] Appl. No.: 860,334

[22] Filed: Mar. 30, 1992

[51] Int. Cl.[5] ............................................. H04B 17/00
[52] U.S. Cl. ....................................... 455/67.1; 455/9; 455/54.1; 455/67.7
[58] Field of Search ............... 455/54.1, 54.2, 67.1, 455/67.4, 67.5, 67.7, 53.1, 115, 62, 9, 63, 70, 71, 127

[56] References Cited

U.S. PATENT DOCUMENTS

| | | |
|---|---|---|
| 4,670,906 | 6/1987 | Thro . |
| 4,723,264 | 2/1988 | Sasuta et al. . |
| 5,086,506 | 2/1992 | Hall et al. ............................. 455/9 |
| 5,093,927 | 3/1992 | Shanley ............................... 455/62 |

FOREIGN PATENT DOCUMENTS

| | | | |
|---|---|---|---|
| 2098427 | 11/1982 | United Kingdom | 455/67.1 |
| 2243055 | 10/1991 | United Kingdom | 455/67.4 |

*Primary Examiner*—Curtis Kuntz
*Assistant Examiner*—Chi Pham
*Attorney, Agent, or Firm*—James A. Coffing; Joseph P. Krause

[57] ABSTRACT

A test device (101) for use in a trunked radio system (102) employs a received signal strength indicator (RSSI) detector (120) to analyze transmission parameters. The test device (101) includes a transceiver (118) for transmitting and receiving radio signals, and a channel controller (116). The test device further includes memory (117) for storing (403) data, and test control means (116) for causing the transceiver to receive (303, 406) outbound signals on active communication channels. The test device (101) then processes (303-305, 402-404) the power levels for the outbound signals, and either re-transmits (305, 307) the results, or stores (407) them in memory.

12 Claims, 4 Drawing Sheets

TEST DEVICE FOR ANALYZING COMMUNICATION CHANNELS IN A TRUNKED RADIO SYSTEM

FIELD OF THE INVENTION

The present invention relates generally to trunked radio communication systems, and more particularly to analyzing transmission parameters of signals, and to provide diagnostics for such a system.

BACKGROUND OF THE INVENTION

Trunked communications systems are well known in both the telephone and mobile radio communications art. In such systems, a plurality of communications units share a limited number of communication resources. Examples of such resources include frequency division multiplex (FDM) frequency pairs, time division multiplex (TDM) time slots, etc. Generally, these communication resources are assigned to communications units (e.g., mobile radios, portable radios, consoles, etc.) by a central resource controller. The resource controller might be implemented as a base control station having central or distributed control logic. In either case, the control base station houses the necessary hardware for communicating with the communication units in its coverage area. This hardware includes transmit circuitry as well as receive circuitry. The transmit path typically includes filters, combiners, transmission lines, and an antenna. The receive path typically includes an antenna, a preamplifier stage, transmission lines, multi-couplers, and filters.

Each of the components in the transmit and receive paths are subject to degradation in performance (e.g., due to aging, thermal stress, etc.), and even complete failure. Of course, when component performance degrades, the integrity of the entire communication system is compromised. In the case of component failure, the system may be inoperable for the time it takes to detect, and repair, the failed circuitry. While complete communication system failure is uncommon, component degradation and hardware failure must be considered when designing for a reliable system. Further, except where there is hardware redundancy, the requirement to repair or replace a failed component exists. Accordingly, the detection of failed or degraded components becomes critical to the overall system performance. That is, the time in which it takes to detect a problem becomes a limiting factor for the integrity of the entire system.

In today's trunked communications systems, the aforementioned components are regularly checked (e.g., by service technicians who perform off-line testing of the hardware using external test equipment. This approach has two problems associated with it. First, the integrity of the system is likely to be only as sound as the maintenance schedule for the system. Without a proper maintenance schedule, system testing is either cost prohibitive, or unreliable (i.e., checked more often than necessary, or checked too infrequently to achieve the required system performance results). Second, the systems must be taken off-line in order to perform the maintenance testing. Of course, this results in reduced system efficiency, reduced revenues, and dissatisfied users.

Accordingly, a hardware testing scheme which could be automatically, and timely, performed would be an improvement over the prior art. Further, a testing scheme which could be performed while the system is on-line would greatly enhance the resulting efficiency of such a scheme.

SUMMARY OF THE INVENTION

The present invention encompasses a test device for use in a trunked radio system to analyze various transmission parameters. The test device includes a transceiver means for transmitting and receiving radio signals, and channel control means for controlling which channels the transceiver transmits and receives on. The test device further includes memory for storing data, and test control means for automatically occasionally causing the transceiver to receive outbound signals on communication channels in use in the trunked communication system. The test device then analyzes the transmission parameters of the outbound signals, and stores them in memory.

DETAILED DESCRIPTION OF A PREFERRED EMBODIMENT

Figure 1:
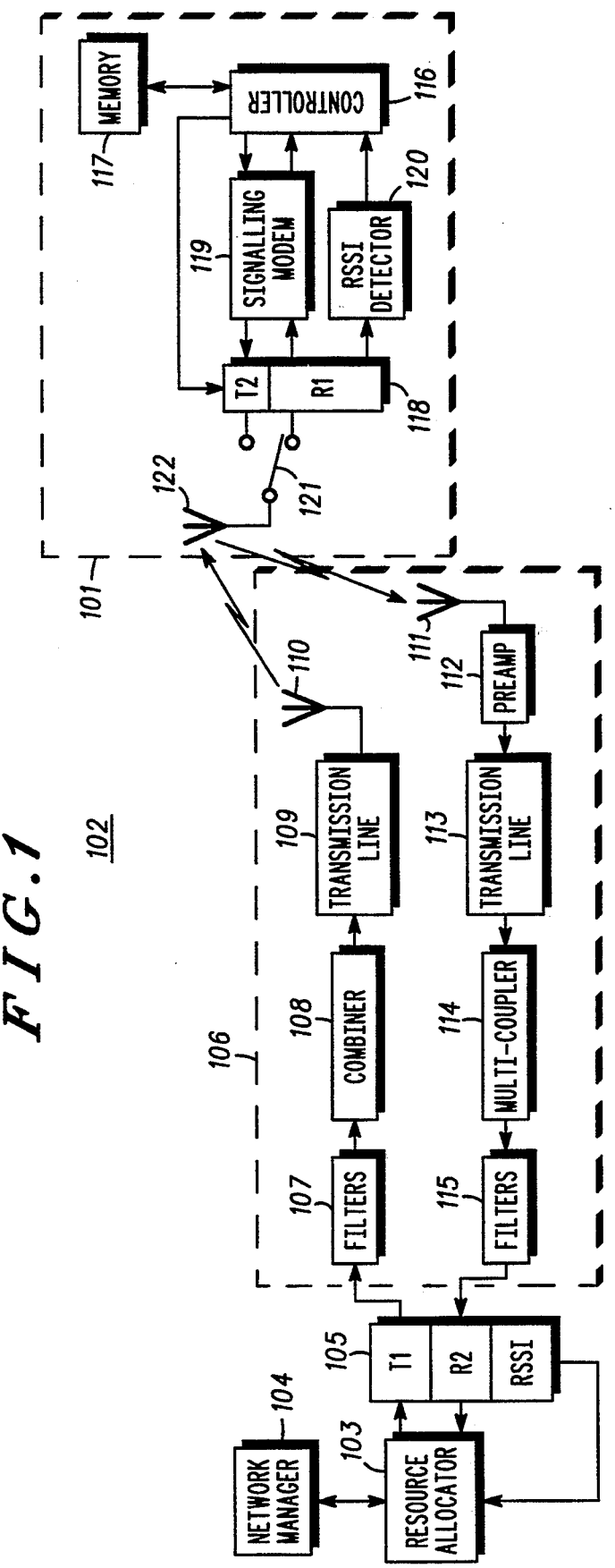
FIG. 1 is a simplified block diagram of a trunked radio communication system, including a preferred testing arrangement in accordance with the invention.

Generally, trunked radio systems provide communications services to communication units located within a particular coverage area, or site. FIG. 1 illustrates a single-site trunked radio system 102, and a test device 101, in accordance with the present invention. In a preferred embodiment, trunked radio system 102 includes a resource allocator 103, a network manager 104, a limited number of communication channels 105, and an antenna system 106 to communicate control signalling to test device 101. Communication channels 105 may be carrier frequencies, frequency pairs, and/or time division multiplexing (TDM) timeslots, and might be equipped with a received signal strength indicator (RSSI). Further, communication channels 105 are coupled to resource allocator 103.

Antenna system 106 is constructed of components, whose combination is well known in the art, that transfer radio signals between channels 105 and subscriber radios (not shown in FIG. 1) within the coverage area. Antenna system 106 might include a transmit path and a receive path for the transmission and reception of radio signals. In a preferred embodiment, the transmit path comprises filters 107, combiner 108, transmission line 109, and transmit antenna 110. The receive path comprises receive antenna 111, pre-amplifier 112, transmission line 113, multi-coupler 114, and filters 115.

In a preferred embodiment, test device 101 includes a controller 116, which may be a microprocessor (e.g., Motorola MC68040 microprocessor), and memory device 117 (e.g., RAM). Additionally, a transceiver 118, a signalling modem 119, an RSSI detector 120, an antenna switch 121, and an antenna 122 may be employed. Controller 116 is operably coupled to transceiver 118 to provide control of the transceiver. Signalling modem 119 translates control signalling, relayed by transceiver 118 to and from trunked radio system 102, into information usable by controller 116.

Among other potential tasks, network manager 104 also provides configuration control, resource fault information, performance statistics, system accounting, and security control for trunked radio system 102. The present invention contemplates three tests that serve to generate resource fault information. In a preferred embodiment, these three tests include: i) passive test; ii) active outbound test; and iii) active inbound/outbound test.

In a preferred embodiment, each of the aforementioned tests rely on the use of transmission parameters as an indication of how the system hardware is performing. One such transmission parameter is a so-called effective radiated power (ERP) of the channel under consideration. That is, resource allocator 103 might encode a prediction of the actual ERP, based upon a current power level of communication channel 105 and a predicted gain factor for the transmit path (use of actual ERP is significant, since the power level of the communication channel may be varied from time to time to meet other requirements). Therefore, test device 101 is presented with the current ERP for the channel under test. Having decoded and stored the transmission parameter in memory, test device 101 is now able to analyze the current outbound signal.

As with any RF communication system, there is a path loss associated with the free space between trunked radio system transmit antenna 110 and test device antenna 122. The outbound path loss, PLo, can be expressed as:

$$PLo = ERP - RSSI$$

Ideally, the difference in ERP and received signal strength remains constant. By contrast, relatively large deviations (i.e., 3 dB or more) can indicate that a component in the transmit path has degraded or failed completely. Accordingly, using the RSSI measurement, and a transmission parameter (e.g., ERP) for the test device, the resource allocator 103 can continuously monitor the difference (i.e., PLo), compare it against a predetermined threshold, and take appropriate action to have the problem corrected, as later described.

Figure 2:
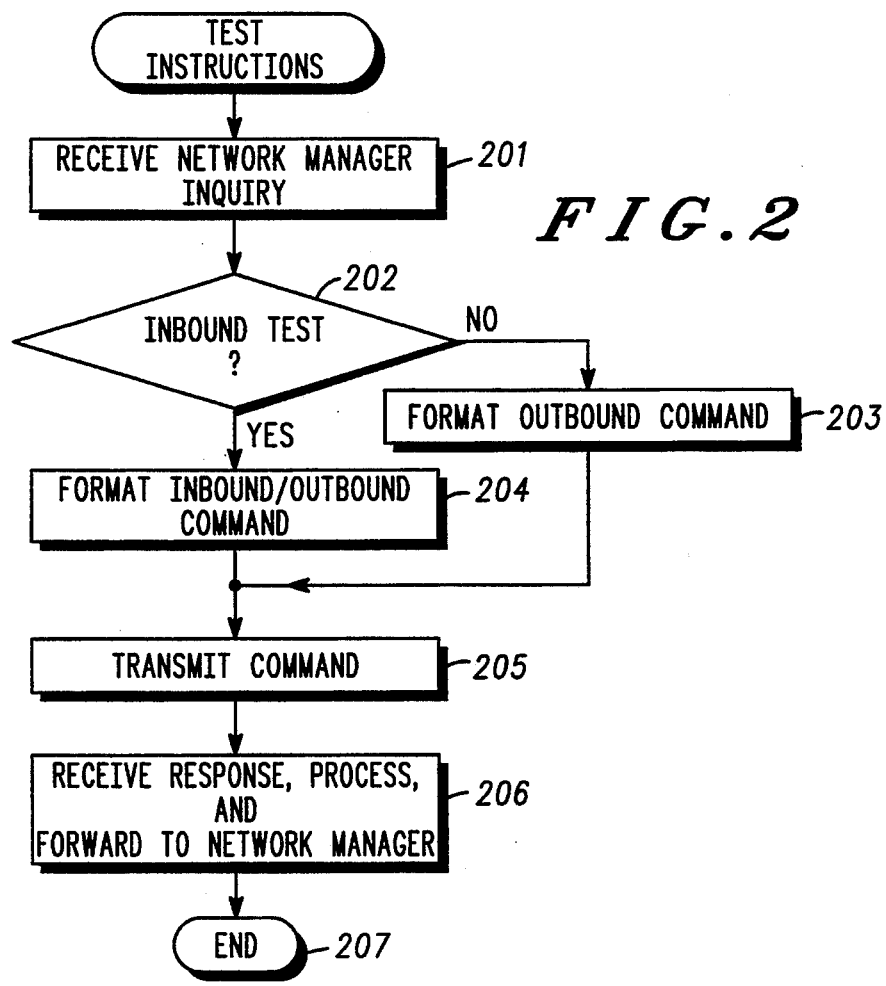
FIG. 2 is a simplified flow diagram depicting one portion of the operation of the resource allocator, in accordance with the invention.

FIG. 2 shows a flow diagram depicting the operation of the resource allocator, in accordance with the present invention. In determining which of the two active tests are being used, an inquiry is received (201) from network manager 104. The inquiry is then tested (202) for inclusion of the inbound test. If an inbound test is required, an active inbound/outbound test command is formatted (204) (i.e., to instruct test device 101 to perform the desired test of the specified channel in both the inbound and outbound directions). If an inbound test is not required, an active outbound test command is formatted (203) (i.e., to instruct test device 101 to perform the desired test of the specified channel in only the outbound direction).

The command instruction also identifies at least one transmission parameter (e.g., ERP) currently associated with the channel under test. The command is transmitted to the test device over one of the communication channels 105, and a response is returned. The received response is then processed and forwarded (206) to the network manager, before the routine is exited (207). In particular, the active outbound test response (i.e., PLo for the tested channel) is simply forwarded. For the active inbound/outbound test, the strength of the test signal (RSSI) is first measured. Then, using the transmission parameter (ERP), the inbound path loss is calculated (e.g., PLi=ERP−RSSI), and forwarded to the network manager.

Unlike the passive test (i.e., which allowed the test device to passively monitor each operating channel, and transmit a message when there is a potential problem), the active test (shown in FIG. 3) employs an inquiry-service relationship between network manager 104 and test device 101. That is, the test device executes a test on a particular (e.g., predetermined or request-specified) communication channel in response to an inquiry by the network manager. For the active outbound test, the calculated difference (PLo), between the transmission parameter and the received signal analysis, is transmitted to the network manager.

Figure 3:
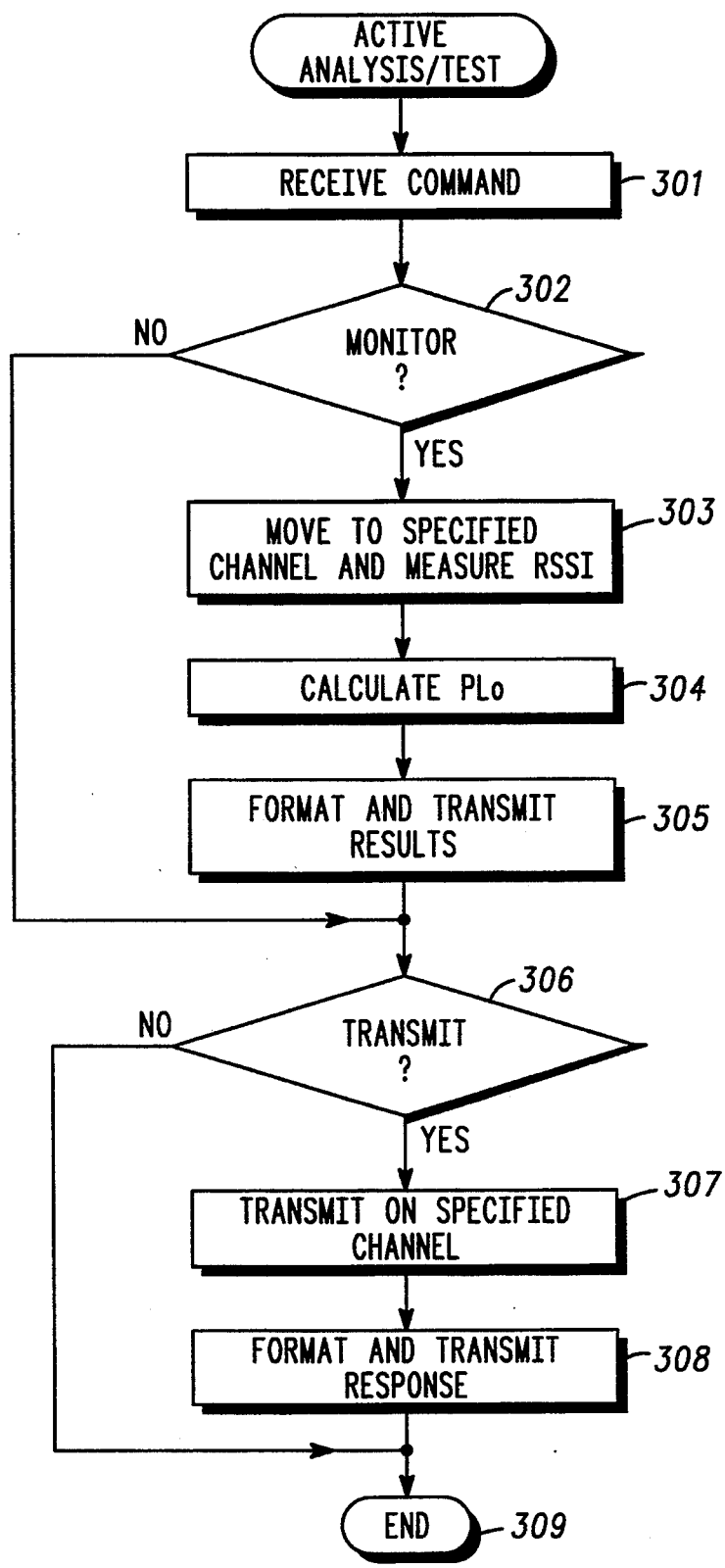
FIG. 3 is a simplified flow diagram depicting the operation of the test device, in accordance with one embodiment of the present invention.

For the active inbound/outbound test, the PLo is also calculated and returned. In addition, the test device transmits a test signal toward the trunked radio system, in order for the inbound path loss to be determined (i.e., evaluating the performance of the receive path in antenna system 106). The test signal is received by the appropriate communication channel, and the RSSI detector associated with that channel measures the received signal level. (Note that the RSSI detector is calibrated to take into account the receiver sensitivity, as well as nominal gains—or losses—associated with the receive path components.) Upon complete transmission of the test signal, the test device encodes an indicia of the particular transmission parameter being sent (e.g., indication of present power level (ERP) for the test device). It should be noted that ERP information is dependent upon the actual transmit power of transceiver 118 and antenna gain 122. In one embodiment, the power level might be kept constant. In another embodiment, the power level might be specified in the instruction issued by the trunked system to invoke the test procedure. Reference is now made to FIG. 3, which shows a simplified flow diagram depicting a sequence of preferred steps, in accordance with the active test embodiments (i.e., outbound and inbound-/outbound) of the invention.

A command instruction, sent from the radio system, is received (301) by the test device. The instruction is then checked (302) to determine whether or not an outbound channel is to be monitored and analyzed. If so (i.e., request is for active outbound or inbound/outbound test), the transceiver is directed to move to the specified channel, where an RSSI measurement is made. Based upon the received transmission parameter ERP, and the measured RSSI, the test device calculates (304) the outbound path loss, PLo. The result is included in a response message which is transmitted (305) to the trunked radio system.

After the response message is transmitted, the received instruction is again checked (306) to determine whether or not a transmit test signal is required (i.e., inbound test requested). If not, the routine is exited (309). If a test signal is required, transceiver 118 is adjusted to the specified channel and, optionally, to a specific power level, and the test signal is transmitted (307). (Note: including a dynamic indication of the actual power level allows the present invention to be used in trunked systems which can vary the transmit power. Thus, the signal paths can be checked at varying power levels, thereby allowing for enhanced diagnostic capabilities.) The test unit then formats and transmits (308) a response signal to the radio system which includes, at least, a transmission parameter (e.g., ERP of the transmitted test signal). After transmitting the response, the routine is exited (309).

By contrast, in passive analysis (see FIG. 4), the test device automatically and occasionally receives outbound signals on communication channels which are in use. The outbound signals are encoded with control signalling, which might be used to convey transmission parameter information to the test device. Then the test device analyzes the received outbound signals with respect to at least one transmission parameter associated with the particular channel. The result is compared to a predetermined criterion, and when the comparison yields a value greater than a predetermined threshold value, the test device transmits an alarm message that a possible problem exists. In a preferred embodiment, the alarm message is transmitted via an inbound communication channel. The resource allocator then passes the decoded information to the network manager. Alternatively, the test device might have a wireline or other direct link with the network manager.

Figure 4:
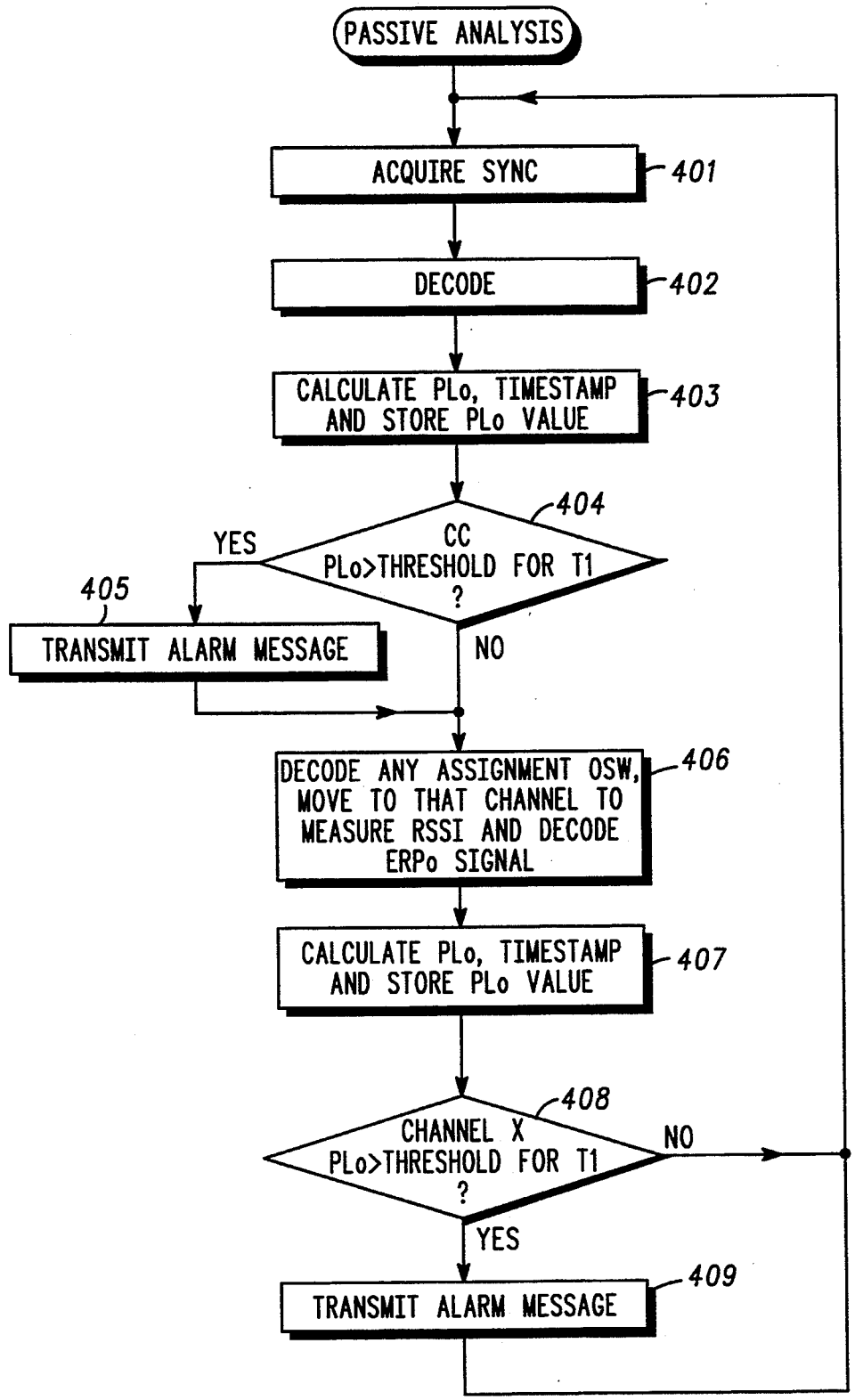
FIG. 4 is a simplified flow diagram depicting the operation of the test device, in accordance with a second embodiment of the present invention.

Referring to FIG. 4, the test device automatically acquires synchronization to the radio system (401) by finding a channel carrying control signalling. This might be carried out by controller 116 tuning transceiver 118 to the known operating communication channels, and looking for control signalling as decoded by signalling modem 119. Once synchronization is established, the control signalling is decoded (402) where transmission parameters are occasionally received. These parameters are stored in memory 117 of the test device for later retrieval. The signal strength (i.e., RSSI) of the outbound signalling from the radio system is then automatically measured. Further, based upon at least one transmission parameter (e.g., ERP), PLo is calculated and stored (403) into memory, along with a corresponding timestamp indicating the reception time.

The calculated control channel PLo is then compared (404) against a predetermined threshold to determine if the power loss exceeds the threshold, for a predetermined period of time (e.g., T1). If the threshold is exceeded during T1, the test device formats and transmits (405) an alarm message indicating that a possible problem exists with that specific channel. This alarm message might be transmitted on an inbound communication channel to the resource allocator, and then relayed to the network manager. In the alternative, the message might be transmitted directly to the network manager by some other suitable means, such as a wireline link. If the threshold had not been reached for T1 seconds, or when the test device has finished transmitting the alarm message, the test device looks for other channels to passively monitor.

In a preferred embodiment, the next available assignment Outbound Signalling Word (OSW) is decoded, which OSW indicates an active channel. The test device then moves (406) to that channel, measures the RSSI, and decodes the control signalling which describes the transmission ERP value for that channel. The path loss (i.e, PLo) is then calculated, and stored (407) in the test device memory with a corresponding timestamp of the reception time. The PLo for this channel is again compared (408) against a predetermined loss threshold, for a period of time (e.g., T1 seconds). If the the threshold is exceeded, the test device formats and transmits (409) an alarm message indicating that a possible problem exists with this particular communication channel. If the threshold has not been reached for T1 seconds, or after transmitting the alarm message, the routine directs the test device to continue passive monitoring (401) of other channels.

Figure 5:
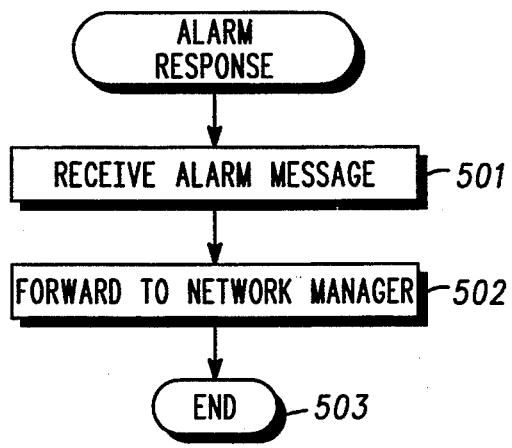
FIG. 5 is a simplified flow diagram depicting another portion of the operation of the resource allocator, in accordance with the invention.

FIG. 5 shows a simplified flow diagram depicting the operation of the resource allocator, in accordance with one embodiment of the invention. An alarm message is received (501) over an inbound communication channel, which message contains PLo and the specific channel number (i.e., obtained via passive analysis, earlier described). After the alarm message is received from a test device, the message is simply forwarded (502) to the network manager, and the routine is exited (503).

Accordingly, a radio system which employs the present invention is able to perform on-line tests on the transmit and receive paths through the use of passive and active channel monitoring. An enhanced test device is used to indicate actual transmit power, receiving system gains, as well as received signal strength. Further, a historical comparison of the calculated path loss for a particular channel can be used to detect a problem in the transmit or receive paths of the trunked radio antenna system. That is, a complete, systematic test of the signal path can be employed to detect degradation and complete failure of critical communications equipment.

What is claimed is:

1. A test device for use in a trunked radio system providing communications services within a coverage area, the device comprising:
   A) transceiver means for transmitting and receiving radio signals;
   B) channel control means, operably coupled to the transceiver means, for controlling which channels the transceiver means transmits and receives on;
   C) memory means for storing data;
   D) test control means, operably coupled to the channel control means and the memory means, for:
      i) automatically occasionally causing the channel control means to cause the transceiver means to receive, on communication channels in use in the trunked communication system, outbound signals that each includes an indicia of a transmission parameter;
      ii) automatically analyzing the outbound signals using the indicia of the transmission parameters to produce a test result; and
      iii) automatically storing the test result in the memory means.

2. The device of claim 1, wherein the channel control means further includes means for transmitting the test result upon receiving an instruction to transmit such information via the transceiver means.

3. The device of claim 1, wherein the radio signals received by the transceiver means comprise control signalling from the trunked radio system.

4. The device of claim 3, wherein the control signalling occasionally comprises a transmission power level for at least one identified channel in the trunked radio system.

5. The device of claim 4, wherein the test control means further comprises means for automatically analyzing outbound signals of the at least one identified channel, with respect to the transmission power level.

6. The device of claim 1, wherein the test control means further comprises means for:
   iv) automatically comparing the test result with a predetermined criterion, and when this comparison yields at least a threshold value, automatically causing the transceiver means to transmit a message indicating that a possible problem exists.

7. A test device for use in a trunked radio system providing communications services within a coverage area, the device comprising:
   A) transceiver means for transmitting and receiving radio signals;
   B) channel control means operably coupled to the transceiver means for controlling which channels the transceiver means transmits and receives on;
   C) test control means operably coupled to the channel control means for:
      i) automatically occasionally causing the channel control means to cause the transceiver means to receive outbound signals on communication channels in use in the trunked communication system;
      ii) causing the channel control means to cause the transceiver means to receive outbound signals, on a particular communication channel that has been identified in a specific test monitoring instruction, wherein the outbound signals comprise an indication of a transmission power level at which the outbound signal is transmitted.

8. The device of claim 7, wherein the test device includes memory, and wherein the test control means further comprises means for storing information regarding at least some of the received outbound signals in the memory.

9. The device of claim 7, wherein the test control means further comprises means for causing the transceiver means to transmit information regarding at least some of the received outbound signals.

10. The device of claim 7, wherein the test control means further comprises means for:
    iii) causing the transceiver to transmit, responsive to a specific instruction received via the transceiver, a test signal on a particular identified channel.

11. The device of claim 10, wherein the test signal is transmitted at a power level that corresponds to a specified power level in the instruction.

12. The device of claim 10, wherein the test signal includes an indicia of the power level at which the transceiver means transmits the test signal.

* * * * *